(12) United States Patent
Tagawa

(10) Patent No.: US 6,943,840 B1
(45) Date of Patent: Sep. 13, 2005

(54) IMAGE SENSING APPARATUS EXECUTING EXPOSURE CONTROL USING OBJECT LUMINANCE INFORMATION

(75) Inventor: Yojiro Tagawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 761 days.

(21) Appl. No.: 09/687,867

(22) Filed: Oct. 13, 2000

(30) Foreign Application Priority Data

Oct. 14, 1999 (JP) .................................. 11-292324

(51) Int. Cl.[7] ............................................ H04N 5/222

(52) U.S. Cl. ............................ 348/333.01; 348/333.12; 396/374

(58) Field of Search ........................... 348/364, 333.01, 348/362, 363, 333.02, 333.12, 333.03; 396/374; 345/98, 97

(56) References Cited

U.S. PATENT DOCUMENTS

| | | | | |
|---|---|---|---|---|
| 5,049,997 A | * | 9/1991 | Arai | 348/364 |
| 5,341,190 A | * | 8/1994 | Ogawa | 396/85 |
| 5,557,358 A | * | 9/1996 | Mukai et al. | 396/296 |
| 5,903,303 A | * | 5/1999 | Fukushima et al. | 348/47 |

* cited by examiner

Primary Examiner—Tuan Ho
Assistant Examiner—Heather R. Long
(74) Attorney, Agent, or Firm—Morgan & Finnegan, LLP

(57) ABSTRACT

This invention has as its object to provide an apparatus which can match the brightness of an image displayed on a viewfinder with a target luminance level in actual exposure. To achieve this object, the apparatus has an image sensing sensor for converting an optical image into an image signal, a viewfinder for displaying the image signal obtained by the image sensing sensor, and a correction device for correcting the brightness of the viewfinder in accordance with the difference between the luminance level of the image signal obtained by the image sensing sensor, and a target luminance level.

19 Claims, 16 Drawing Sheets

FIG. 2

| S1 | S2 | S3 | S4 | S5 | S6 |
|----|----|----|----|----|----|
| S7 | S8 | S9 | S10 | S11 | S12 |
| S13 | S14 | S15 | S16 | S17 | S18 |
| S19 | S20 | S21 | S22 | S23 | S24 |
| S25 | S26 | S27 | S28 | S29 | S30 |
| S31 | S32 | S33 | S34 | S35 | S36 |

FIG. 5

| S1 | S2 | S3 | S4 | S5 | S6 |
|----|----|----|----|----|----|
| S7 | S8 | S9 | S10 | S11 | S12 |
| S13 | S14 | S15 | S16 | S17 | S18 |
| S19 | S20 | S21 | S22 | S23 | S24 |
| S25 | S26 | S27 | S28 | S29 | S30 |
| S31 | S32 | S33 | S34 | S35 | S36 |

FIG. 6

| S1 | S2 | S3 | S4 | S5 | S6 |
|---|---|---|---|---|---|
| S7 | S8 | S9 | S10 | S11 | S12 |
| S13 | S14 | S15 | S16 | S17 | S18 |
| S19 | S20 | S21 | S22 | S23 | S24 |
| S25 | S26 | S27 | S28 | S29 | S30 |
| S31 | S32 | S33 | S34 | S35 | S36 |

FIG. 7

| S1 | S2 | S3 | S4 | S5 | S6 |
|----|----|----|----|----|----|
| S7 | S8 | S9 | S10 | S11 | S12 |
| S13 | S14 | S15 | S16 | S17 | S18 |
| S19 | S20 | S21 | S22 | S23 | S24 |
| S25 | S26 | S27 | S28 | S29 | S30 |
| S31 | S32 | S33 | S34 | S35 | S36 |

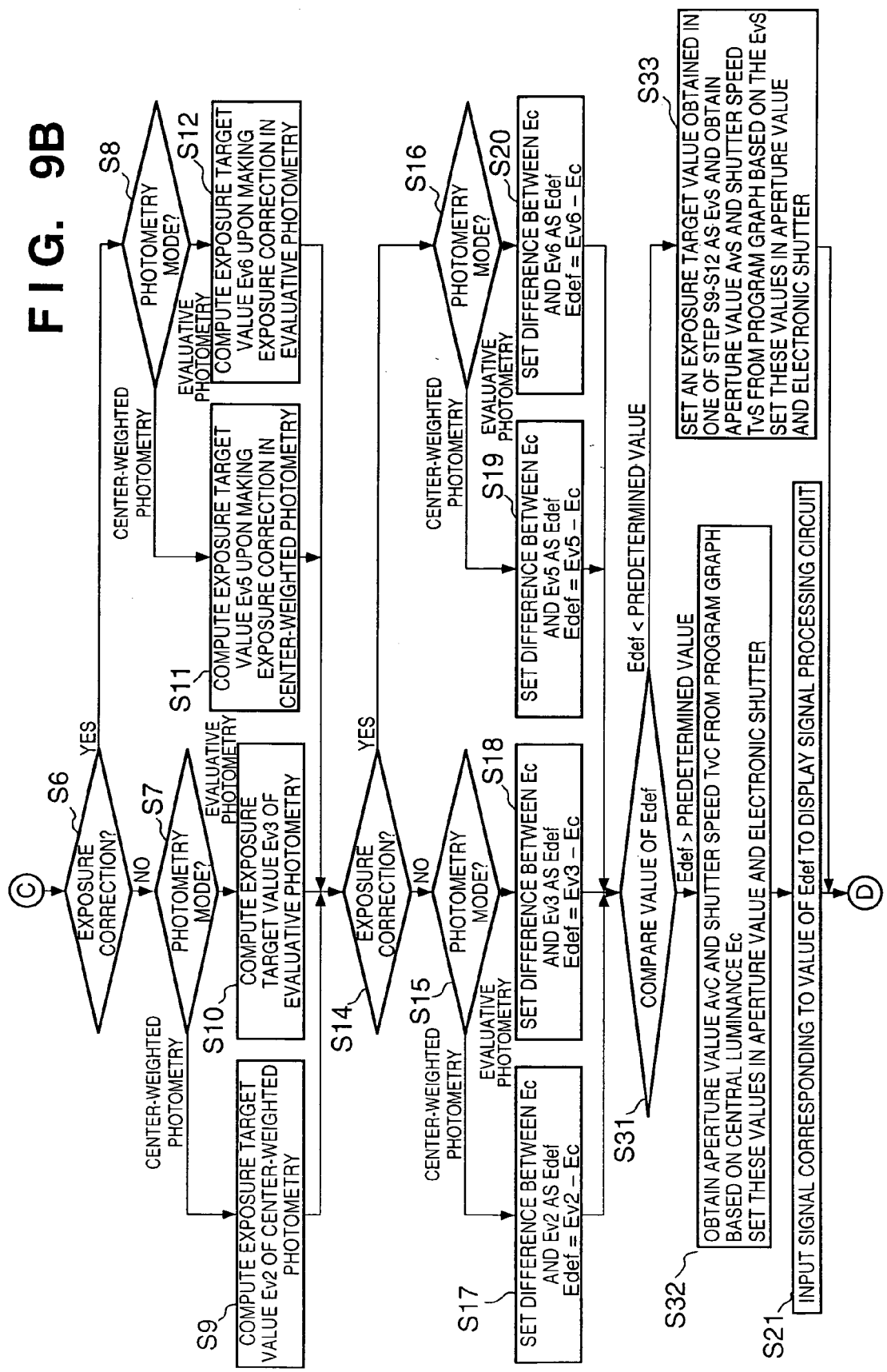

IMAGE SENSING APPARATUS EXECUTING EXPOSURE CONTROL USING OBJECT LUMINANCE INFORMATION

FIELD OF THE INVENTION

The present invention relates to an image sensing apparatus which executes exposure control using object luminance information, an image capture apparatus, their control method, and a computer program product.

BACKGROUND OF THE INVENTION

An image sensing apparatus such as a digital still camera or the like, which comprises an electronic viewfinder (to be abbreviated as an EVF hereinafter) that displays the output from an image sensing element on a display device to confirm the composition and exposure upon actual image sensing as a viewfinder, has been proposed.

Also, in an image sensing apparatus such as a digital still camera or the like, a method of computing the exposure level by measuring the object luminance on the basis of a sensed image signal output from an image sensing element has been conventionally proposed.

As photometry methods of these image sensing apparatuses to measure the object luminance, center-weighted photometry that computes a target luminance by weighting with predetermined coefficients using the central region of a screen as the center on the basis of a sensed image signal of a specific region of the screen or sensed image signals of a plurality of divided regions, and evaluative photometry that computes a target luminance using a specific algorithm on the basis of information of each region are known.

Also, an image sensing apparatus which comprises an exposure correction function of correcting the exposure value in accordance with the photographer's will irrespective of the photometry method is generally known.

An example will be explained below.

FIG. 11 is a block diagram of a digital still camera.

Referring to FIG. 11, reference numeral 1 denotes an optical lens for forming an optical image on an image sensing element. The optical lens 1 includes a focus lens (not shown) for focus adjustment. Reference numeral 2 denotes a stop & shutter which has both stop and shutter functions; and 3, a driving circuit for mechanical units of the optical lens 1 and stop & shutter 2. Reference numeral 4 denotes an image sensing element for converting an object image formed by the optical lens into an electrical signal; 5, a timing signal generation circuit (to be abbreviated as TG hereinafter) for generating timing signals required for operating the image sensing element; 6, an image sensing element driving circuit for amplifying a signal from the TG to a level at which the image sensing element can be driven; 7, a pre-processing circuit which comprises a CDS circuit and amplifier circuit used to reduce output noise of the image sensing element 4; 8, an A/D converter; 9, a sensed image signal processing circuit; 10, a recording medium which comprises, e.g., a memory card that complies with PCMCIA standards, hard disk, or the like; and 11, an interface circuit for recording a signal on the recording medium 10. Reference numeral 12 denotes a system controller serving as a control CPU for controlling the respective mechanisms, a console, and the sensed image signal processing circuit; 13, a console used to externally control the camera; 14, a display signal processing circuit for displaying a signal on a display device; 15, a D/A converter; and 16, a display device used as a viewfinder.

In the image sensing apparatus shown in FIG. 11, when the photographer operates the console 13 to start viewfinder display, the mechanism driving circuit 3 is driven under the control of the system controller 12 to supply electric power to respective image sensing circuits. The stop & mechanical shutter 2 is driven to a predetermined default aperture size to start exposure of the image sensing element, and electronic shutter and read pulses are supplied from the TG 5 to the image sensing element 4 via the image sensing element driving circuit 6 so as to accumulate a photocharge for only a predetermined default exposure time. The signal read in the aforementioned state is converted into a luminance level signal for photometry and a viewfinder output signal by the sensed image signal processing circuit 9 via the pre-processing circuit 7 and A/D converter 8. The luminance level signal is sent to the system controller 12, which determines an exposure value corresponding to the luminance level, computes an aperture value and shutter speed in correspondence with the exposure value, and controls the stop & mechanical shutter 2 and electronic shutter for the next exposure in accordance with the obtained values. After that, photometry is repeated in units of fields to control exposure. The viewfinder output signal is sent to the display device 16 via the D/A converter 15 and display signal processing circuit 14. The display device 16 displays an object which is being sensed.

Photometry of Each Frame

The operation inside the system controller upon photometry will be explained below. In FIG. 11, the sensed image signal processing circuit 9 sends, to the system controller 12, luminance values YA, YB, and YC respectively obtained by integrating signals on screen regions A, B, and C shown in FIG. 12.

The photometry process in the system controller will be explained below. Let Sa, Sb, and Sc be the areas of the screen regions A, B, and C. Then, luminance values Ya, Yb, and Yc per unit area of the screen regions A, B, and C are respectively given by:

$$Ya = YA/Sa$$

$$Yb = YB/Sb$$

$$Yc = YC/Sc$$

By computing the logarithms of differences from a predetermined luminance level reference value Yref, differences from appropriate luminance levels of the respective frames are respectively obtained as $dEv\_a$, $dEv\_b$, and $dEv\_c$:

$$dEv\_a = \log_2(Ya/Yref)$$

$$dEv\_b = \log_2(Yb/Yref)$$

$$dEv\_c = \log_2(Yc/Yref)$$

On the other hand, let Av0 be an Av value obtained by converting the aperture size set in the stop & mechanical shutter 2 upon exposure, and Tv0 be a Tv value obtained by converting an exposure time. Then, Ev0 as a set Ev value upon exposure is given by:

$$Ev0 = Av0 + Tv0$$

The Ev values of the respective frames are respectively given by:

$$Ev\_a = Ev0 + dEv\_a$$

$$Ev\_b = Ev0 + dEv\_b$$

$$Ev\_c = Ev0 + dEv\_c$$

Averaging Photometry

Let Ev1 be the luminance level of the entire screen, which is obtained by weighting the regions A, B, and C in accordance with their areas, and is given by:

$$Ev1=Ev0+(dEv\_a \times Sa+dEv\_b \times Sb+dEv\_c \times Sc)/(Sa+Sb+Sc)$$

Center-weighted Photometry

On the other hand, let Ev2 be the luminance level of the entire screen obtained by weighting the regions A, B, and C using predetermined weighting coefficients kWeiA, kWeiB, and kWeiC as per:

$$Ev2=Ev0+(dEv\_a \times kWeiA+dEv\_b \times kWeiB+dEv\_c \times kWeiC)/(kWeiA+kWeiB+kWeiC)$$

Note that weighting coefficients kWeiA, kWeiB, and kWeiC are set to satisfy:

$$(kWeiA/Sa)>(kWeiB/Sb)>(kWeiC/Sc)$$

so as to achieve center-weighed photometry.

Evaluative Photometry

The luminance differences between the regions A and B, and B and C are given by:

$$deltaBA=Ev\_b-Ev\_a$$

$$deltaCB=Ev\_c-Ev\_b$$

An exposure correction value α of evaluative photometry is computed from the values deltaBA and deltaCB. For example, it is determined that the luminance of the screen central portion is lower, i.e., the degree of back light is larger with increasing values deltaBA and deltaCB, and α is increased to attain back light correction.

Let Ev3:

$$Ev3=Ev2-\alpha$$

be the target luminance level obtained by correcting α.

Using Ev1, Ev2, and Ev3 as exposure target values in the averaging, center-weighted, and evaluative photometry modes, respectively, various photometry schemes can be provided.

Exposure Correction

When Compβ represents an exposure correction value set when the photographer operates the console 13, and Ev4, Ev5, and Ev6 represent the sums of the exposure target values Ev1, Ev2, and Ev3

$$Ev4=Ev1+Comp\beta \text{ (averaging photometry)}$$

$$Ev5=Ev2+Comp\beta \text{ (center-weighted photometry)}$$

$$Ev6=Ev3+Comp\beta \text{ (evaluative photometry)}$$

in the respective photometry mode and Compβ, i.e., exposure target values upon setting exposure correction, an image sensing apparatus with an exposure correction function can be provided.

AE During EVF Display

In an EVF display mode, photometry for obtaining an exposure target value and exposure as image sensing for EVF display must be simultaneously done.

Hence, when Ev0 as the luminance value upon exposure adopts an exposure target value computed upon exposure one or more cycles before, an exposure result corresponding to the selected photometry mode and exposure correction value can always be confirmed on the EVF.

As a versatile image sensing element used in the image sensing apparatus such as a digital still camera or the like, a CCD is known. The CCD can measure a luminance range of around 8 EV.

Since the luminance range of a general object is around 5 EV, the luminance of the object can be accurately measured by setting the object central luminance as the center of the luminance distribution of the object to be close to the photometry central luminance as the center of the luminance range measured by the CCD.

In a still camera with an EVF, by displaying an image sensed using an exposure value equivalent to the exposure target value upon actual image sensing on the EVF, whether or not exposure of the image is appropriate can be estimated in advance. For this purpose, in the EVF display mode, photometry for computing an exposure target value and exposure for sensing an EVF display image are simultaneously done. Hence, the exposure target value inevitably matches the photometry central luminance in this case.

However, when evaluative photometry or exposure correction is done, as described above, the exposure target value does not often match the object central luminance, and has a difference of several EV in some cases. That is, since the photometry central luminance is separated from the object central luminance, the object luminance range readily falls outside the photometry luminance range of the CCD, and it becomes impossible to measure the object luminance in this case.

When photometry is made using the object central luminance or an exposure target value obtained by averaging photometry irrespective of the exposure target value, the luminance distribution of the object is highly likely to fall within the dynamic range of the CCD. However, the exposure result using the exposure target value of the selected photometry mode cannot be confirmed on the EVF in advance.

SUMMARY OF THE INVENTION

Therefore, the present invention has been made in consideration of the aforementioned problems, and has as its object to provide an image sensing apparatus, which can match the brightness of an image displayed on an EVF with a target luminance level in actual exposure even in an EVF mode, an image capture apparatus, their control method, and a computer program product.

In order to solve the aforementioned problems and to achieve the above object, an apparatus according to the present invention is characterized by comprising an image sensing sensor for converting an optical image into an image signal, a viewfinder for displaying the image signal obtained by the image sensing sensor, and a correction device for correcting brightness of the viewfinder in accordance with a difference between a luminance level of the image signal obtained by the image sensing sensor, and a target luminance level.

A control method according to the present invention is a control method for controlling an image sensing apparatus, and is characterized by comprising the step of displaying the image signal obtained by the image sensing sensor on the viewfinder, and correcting the brightness of the viewfinder in accordance with a difference between a luminance level of the image signal obtained by the image sensing sensor, and a target luminance level.

A computer program product according to the present invention is a computer program product that supplies a control program of an image sensing apparatus, and is characterized by including a content of displaying the image signal obtained by the image sensing sensor on the viewfinder, and correcting the brightness of the viewfinder in accordance with a difference between a luminance level of the image signal obtained by the image sensing sensor, and a target luminance level.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a view showing divided regions of a screen;

FIG. 5 is a view showing divided regions of a screen;

FIG. 6 is a view showing divided regions of a screen;

FIG. 7 is a view showing divided regions of a screen;

FIGS. 9A to 9C are flow charts showing the operation sequence according to the second embodiment of the present invention;

DETAILED DESCRIPTION OF THE PREFERRED EMBODIMENTS

The preferred embodiments of the present invention will be described in detail hereinafter with reference to the accompanying drawings.

First Embodiment

Figure 1:
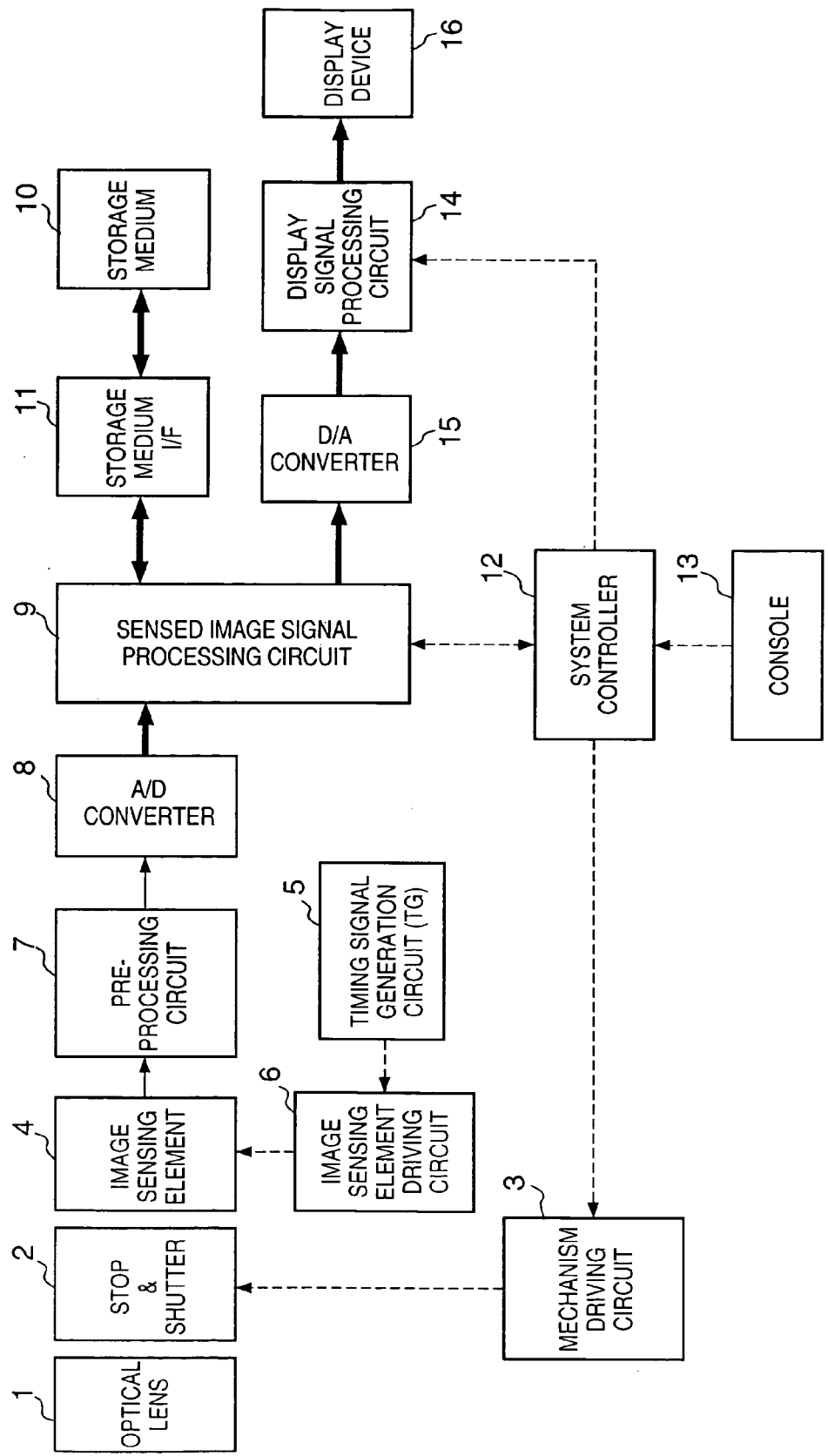
FIG. 1 is a block diagram showing the arrangement of an image sensing apparatus according to the first embodiment of the present invention.
Figure 11:
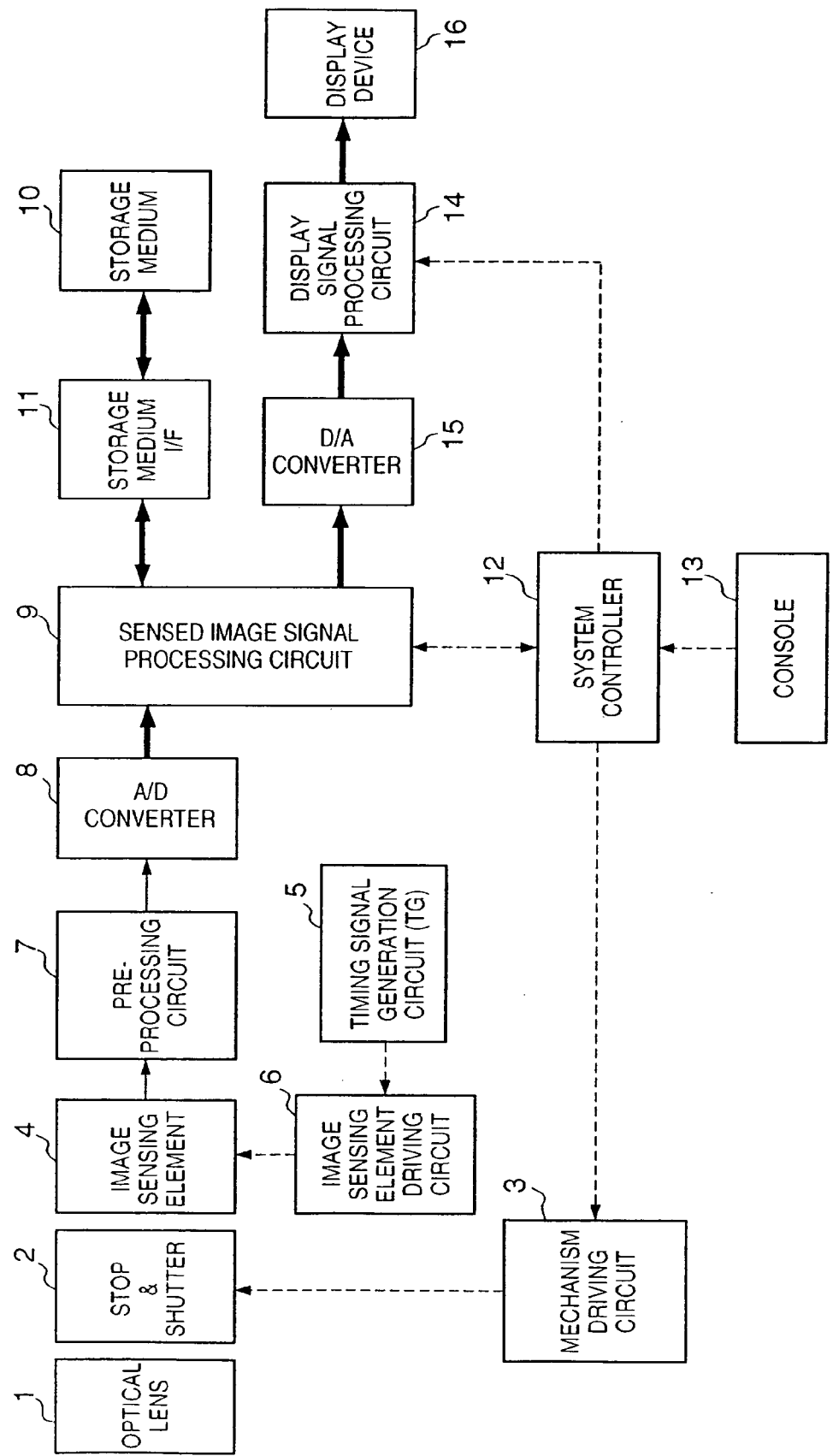
FIG. 11 is a block diagram showing the arrangement of a digital still camera.

FIG. 1 is a block diagram showing the arrangement of the first embodiment of an image sensing apparatus according to the present invention. Since reference numerals 1 to 16 correspond to those in the block diagram shown in FIG. 11, a description thereof will be omitted.

The photometry operation in the first embodiment will be explained below.

In FIG. 1, a sensed image signal processing circuit 9 sends luminance values Ys1 to Ys36 obtained by integrating signals on divided screen regions S1 to S36 shown in FIG. 2 to a system controller 12. Since all the regions S1 to S36 have an identical area, Ys1 to Ys36 can be considered as the luminance values per unit area.

Figure 3A:
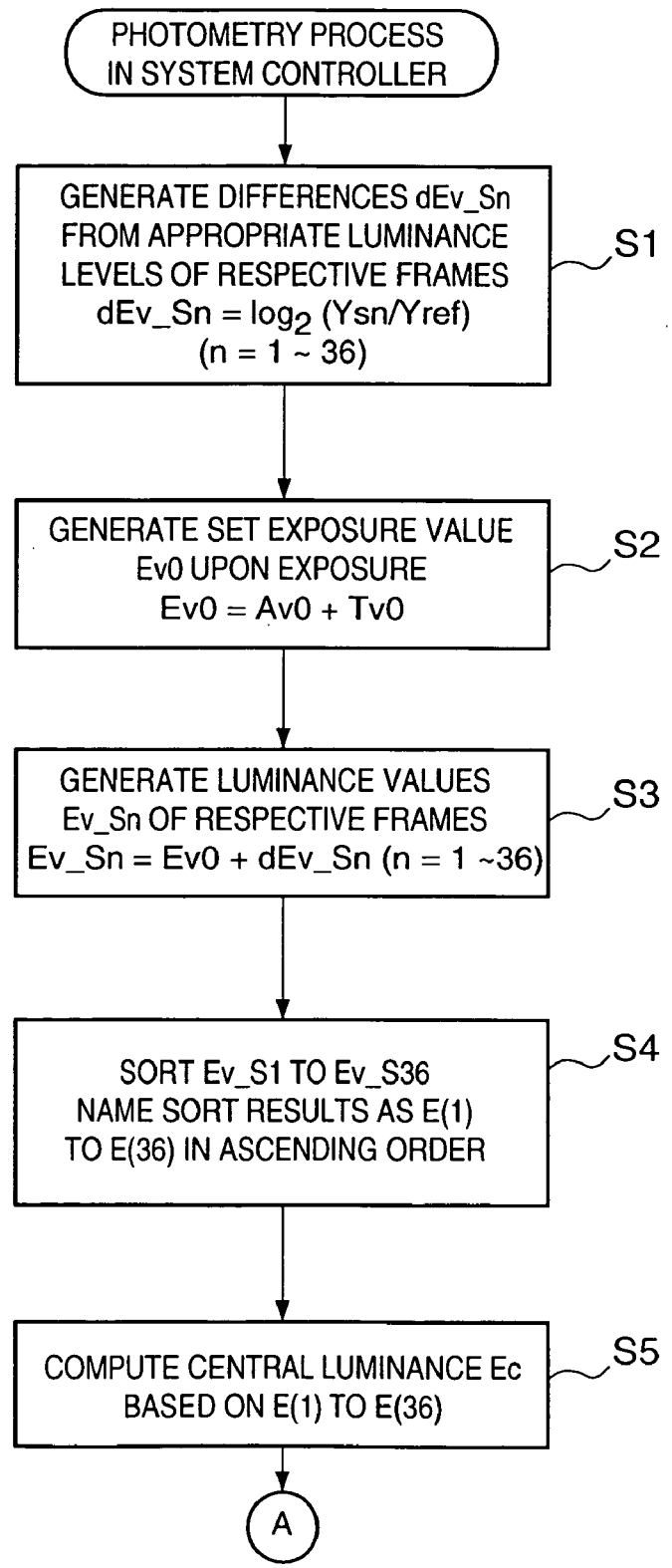
FIGS. 3A to 3C are flow charts showing the operation sequence of the first embodiment.
Figure 3B:
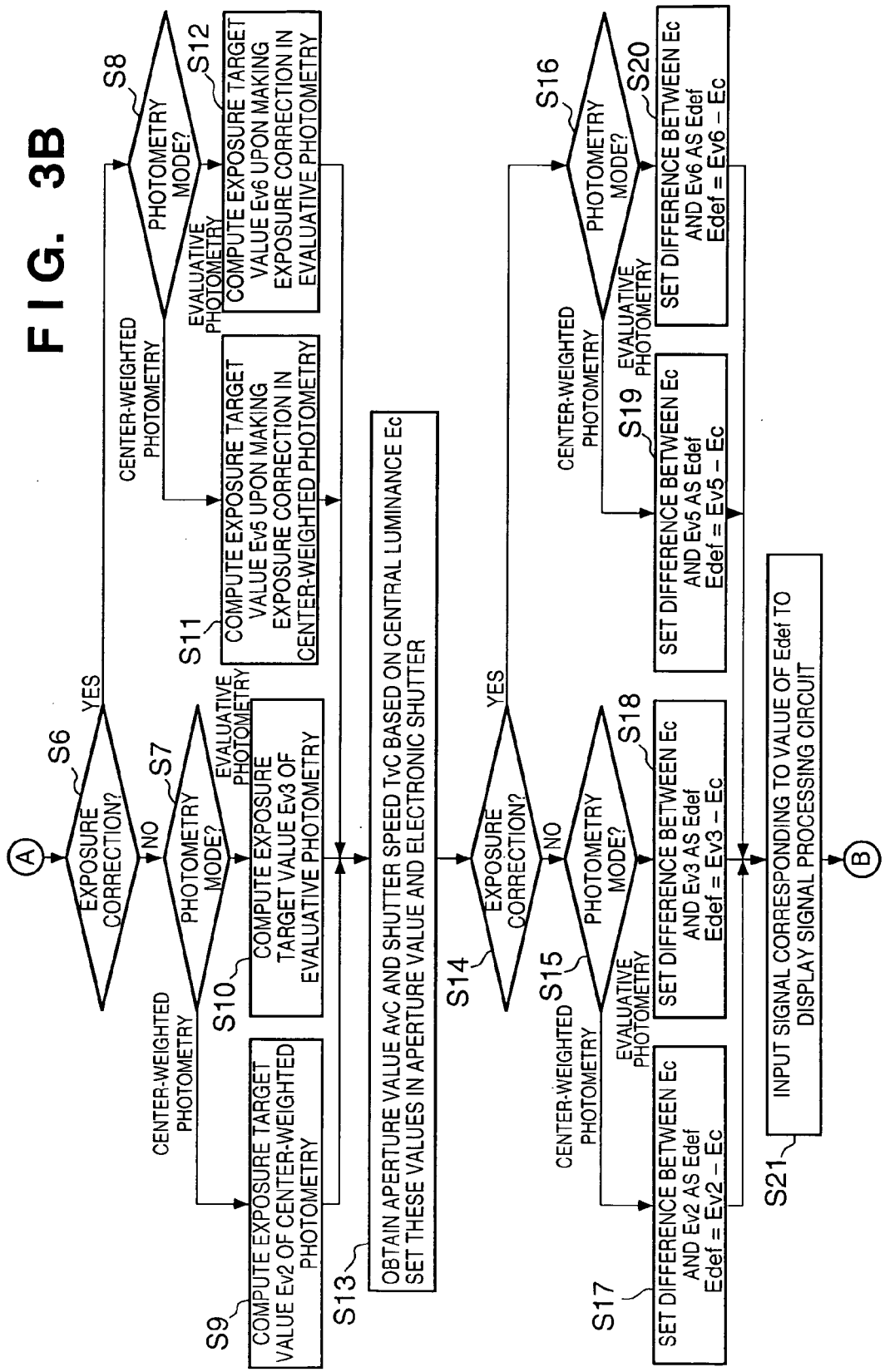
Figure 3C:
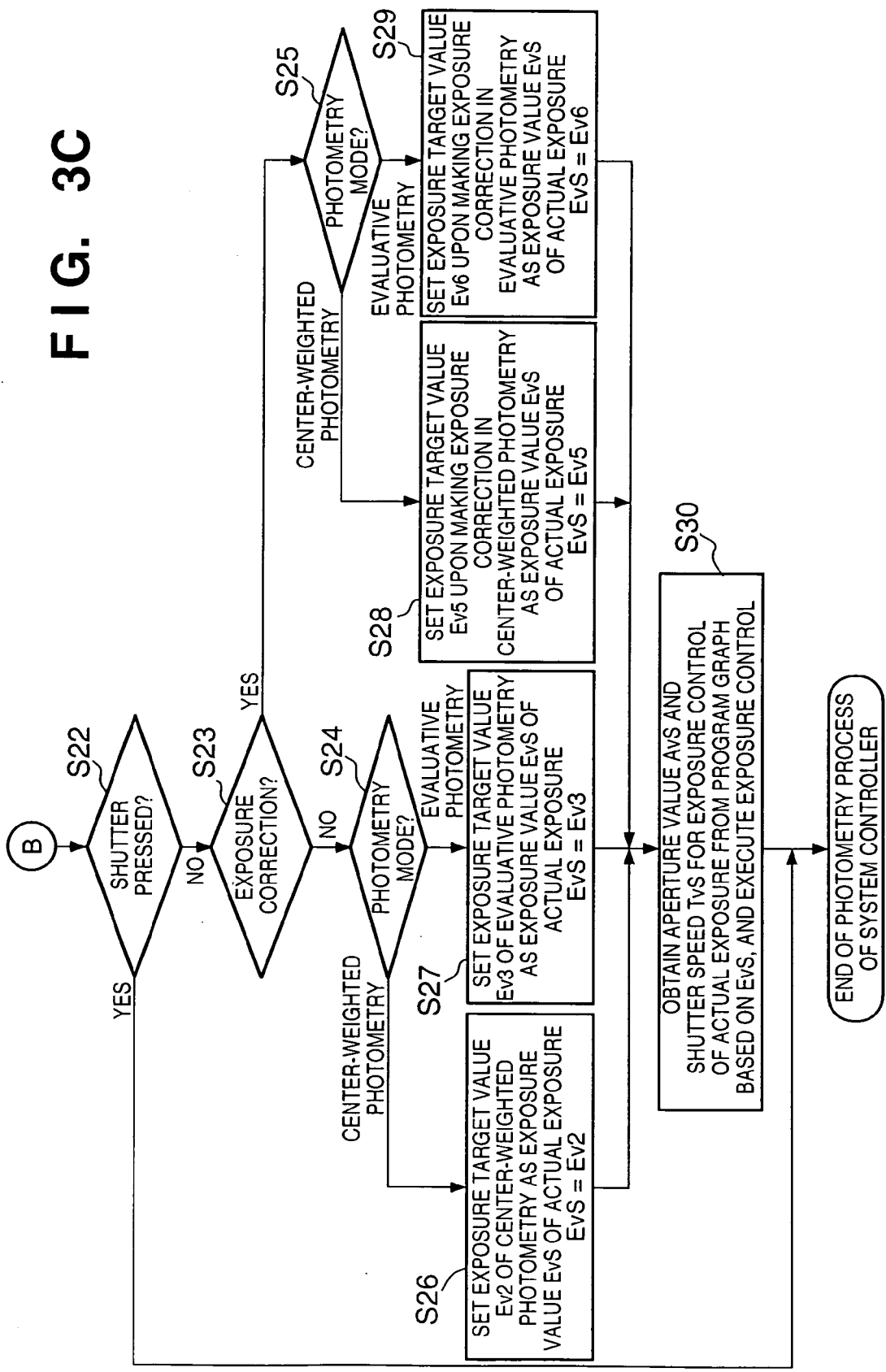

The photometry process in the system controller will be explained below with reference to the flow charts shown in FIGS. 3A to 3C.

Step S1: By computing differences from a predetermined luminance level reference value Yref as logarithms, differences from appropriate luminance levels of respective frames are obtained as $dEv\_Sn$ ($n= 1$ to $36$)

$$dEv\_Sn = log_2(Ysn/Yref)$$

Step S2: Let Av0 be an Av value obtained by converting an aperture size set in a stop & shutter 2 upon exposure, and Tv0 be a Tv value obtained by converting an exposure time. Then, set Ev0 upon exposure is obtained as $$Ev0 = Av0 + Tv0$$

Step S3: The Ev values of the respective frames are given by:

$$Ev\_Sn = Ev0 + dEv\_Sn \ (n=1 \text{ to } 36)$$

Then, the object central luminance is obtained.

Step S4: The values Ev_S1 to Ev_S36 are sorted and the sorted values are named E(1), E(2), E(3), . . . , E(36) in ascending order.

Step S5: The object central luminance is computed.

Figure 4:
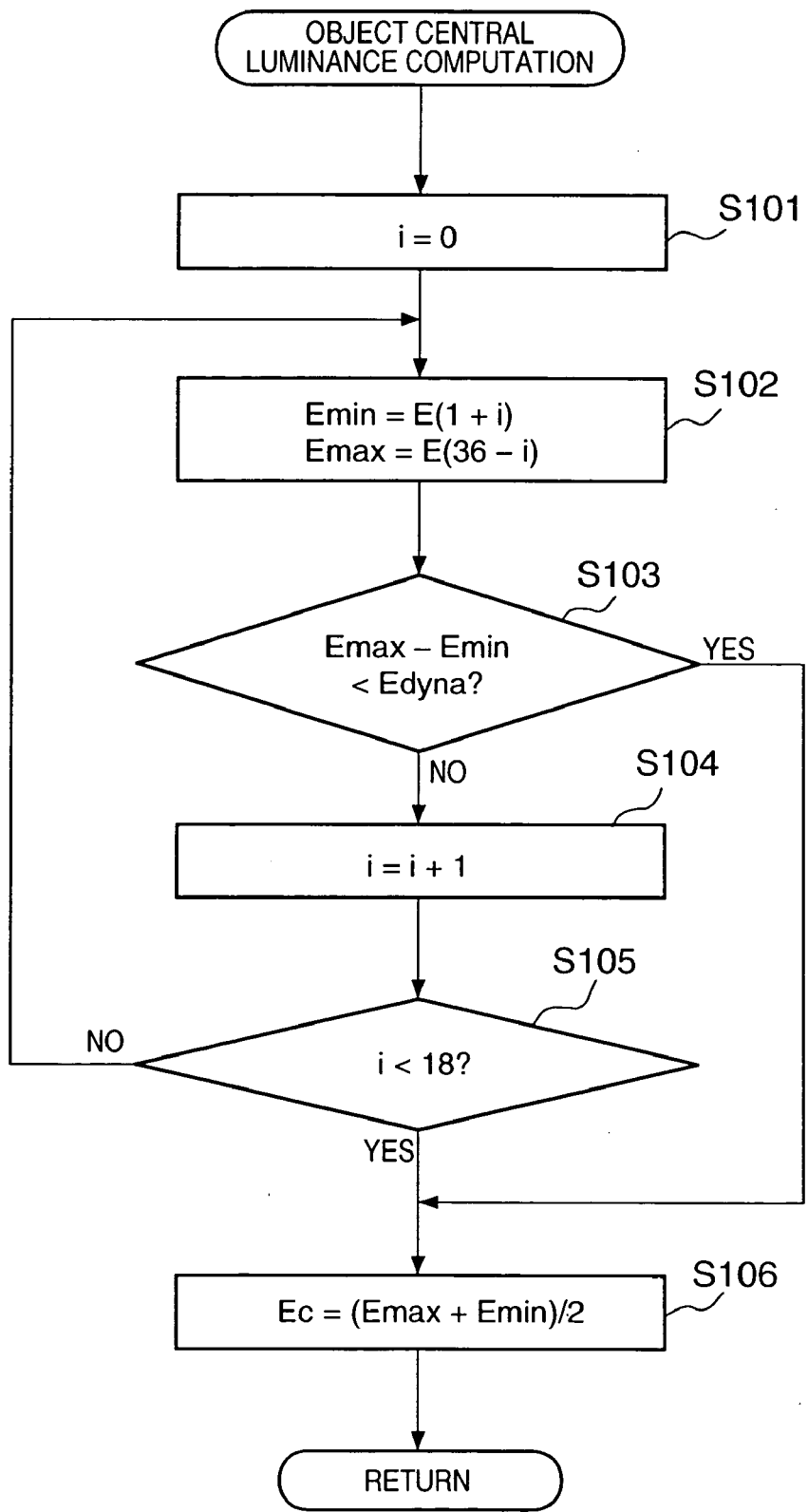
FIG. 4 is a flow chart showing the sequence for computing an object central luminance.

An example of the method of computing the object central luminance will be explained below with reference to the flow chart in FIG. 4.

Step S101: A loop counter i is reset to zero.

Step S102: E(1+i) and E(36−i) are respectively substituted in variables Emin and Emax.

Step S103: The difference between Emin and Emax is computed, and is compared with a predetermined value Edyna. Note that Edyna is the predetermined value obtained based on the dynamic range of the CCD. If the difference between Emin and Emax is smaller than Edyna, since it is determined that values ranging from E(1+i) to E(36−i) fall within the photometry range in single exposure, the control leaves the loop, and the flow advances to step S6.

Step S104: i is incremented.

Step S105: The loop repeats itself while $i \leq 18$.

Step S106: A value obtained by dividing the sum of Emax and Emin by 2 is set to be an object central luminance Ec.

Step S6: It is checked if exposure correction is set at a console 13.

Steps S7 and S8: A photometry mode set at the console 13 is discriminated.

Step S9: If it is determined in step S6 that no exposure correction is set and it is determined in step S7 that the photometry mode is a center-weighted photometry mode, an exposure target value Ev2 of center-weighted photometry is computed.

Step S10: If it is determined in step S6 that no exposure correction is set and it is determined in step S7 that the photometry mode is an evaluative photometry mode, an exposure target value Ev3 of evaluative photometry is computed.

Step S11: If it is determined in step S6 that exposure correction is set and it is determined in step S8 that the photometry mode is the center-weighted photometry mode, an exposure target value Ev5 upon making exposure correction in center-weighted photometry is computed.

Step S12: If it is determined in step S6 that exposure correction is set and it is determined in step S7 that the photometry mode is the evaluative photometry mode, an exposure target value Ev6 upon making exposure correction in evaluative photometry is computed.

Figure 12:
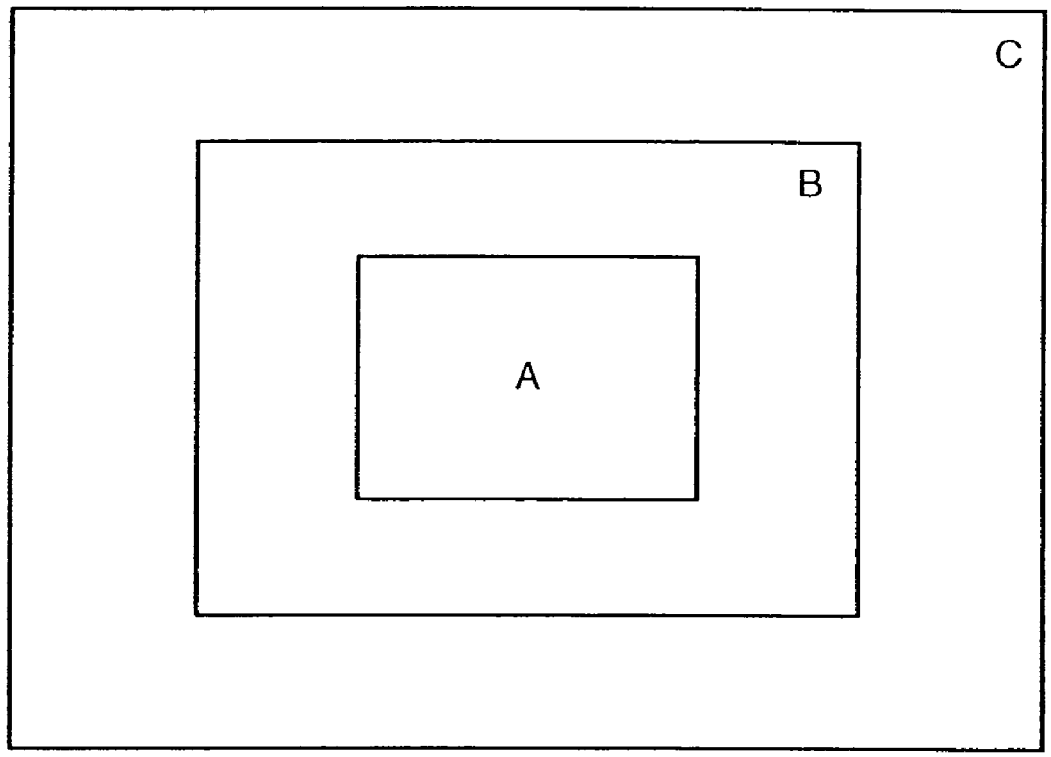
FIG. 12 is a view showing divided regions of the screen.

Note that the exposure target values in steps S9 to S12 are computed as follows. That is, let YA, YB, and YC be the sums of those included in hatched portions shown in FIGS. 5, 6, and 7 of the luminance values Ys1 to Ys36, which are integrated in units of screen regions S1 to S36 shown in FIG. 2. Then, YA, YB, and YC are equivalent to the luminance values of the screen regions A, B, and C shown in FIG. 12. Hence, the exposure target values Ev2 of center-weighted photometry, the exposure target value Ev3 of evaluative photometry, the exposure target value Ev5 upon making exposure correction in center-weighted photometry, and the exposure target value Ev6 upon making exposure correction in evaluative photometry can be respectively computed using methods equivalent to those described above.

Figure 8:
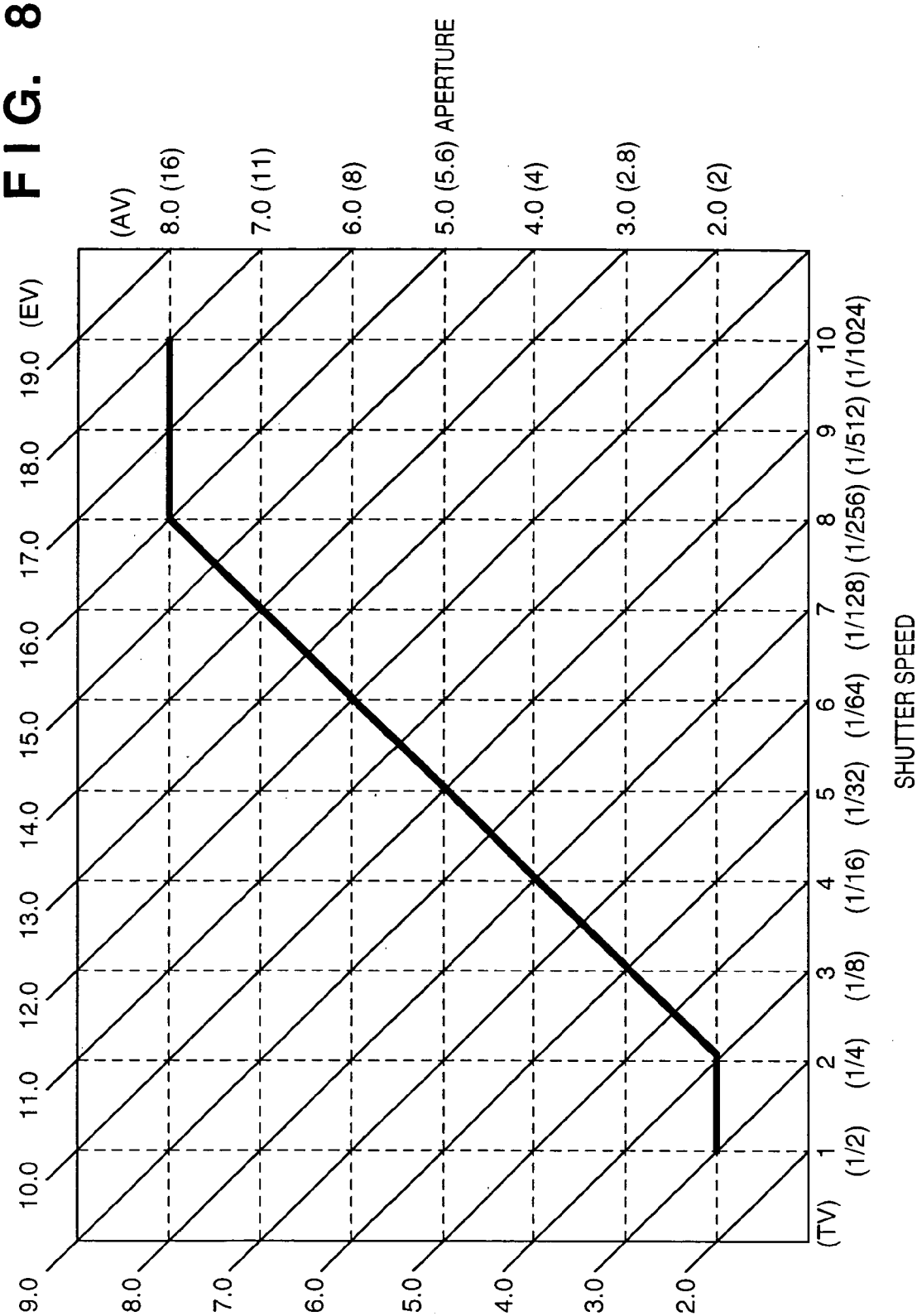
FIG. 8 is a program graph.

Step S13: An aperture value AvC and shutter speed value TvC which are obtained by applying the object central luminance Ec to the program graph shown in FIG. 8 are set.

In the image sensing apparatus shown in FIG. 1, the aperture value of the stop & mechanical shutter 2 is set at AvC, and electronic shutter and read pulses are supplied from a TG 5 to an image sensing element 4 via an image sensing element driving circuit 6 to accumulate a photocharge for an exposure time corresponding to TvC. A signal read in the aforementioned state is converted into a viewfinder output signal by the sensed image signal processing circuit 9 via a pre-processing circuit 7 and A/D converter 8, and the converted signal is sent to a display device 16 via a D/A converter 15 and display signal processing circuit 14.

Steps S14 to S20: The system controller 12 selects one of the exposure target values Ev2 of center-weighted photometry, the exposure target value Ev3 of evaluative photometry, the exposure target value Ev5 upon making exposure correction in center-weighted photometry, and the exposure target value Ev6 upon making exposure correction in evaluative photometry in accordance with the photometry mode and exposure correction value set at the console 13, and computes a difference Edef between the selected value and object central luminance Ec. For example, if the photometry mode is evaluative photometry and exposure correction is set, Edef is given by:

$$Edef = Ev6 - Ec$$

Step S21: The system controller 12 inputs a signal corresponding to the value Edef to the display signal processing circuit 14, which adjusts the gain and offset level of an analog video signal to be output to the display device 16 in accordance with the input signal, thus realizing EVF display having brightness equivalent to the exposure target value.

Steps S22 to S29: While driving the EVF in this state, if the photographer has pressed the shutter release button on the console 13, the system controller 12 selects one of the exposure target values Ev2 of center-weighted photometry, the exposure target value Ev3 of evaluative photometry, the exposure target value Ev5 upon making exposure correction in center-weighted photometry, and the exposure target value Ev6 upon making exposure correction in evaluative photometry in accordance with the photometry mode and exposure correction value set by the photographer at the console 13, and sets the selected value as an exposure value EvS of actual exposure (image sensing). For example, if the photometry mode is evaluative photometry and exposure correction is set, EvS is:

$$EvS = Ev6$$

Step S30: An aperture value AvS and shutter speed value TvS obtained by applying the exposure value EvS of actual exposure to the program graph shown in FIG. 8 are set to determine an exposure value in actual exposure, and exposure control for actual exposure is executed.

Second Embodiment

Figure 9A:
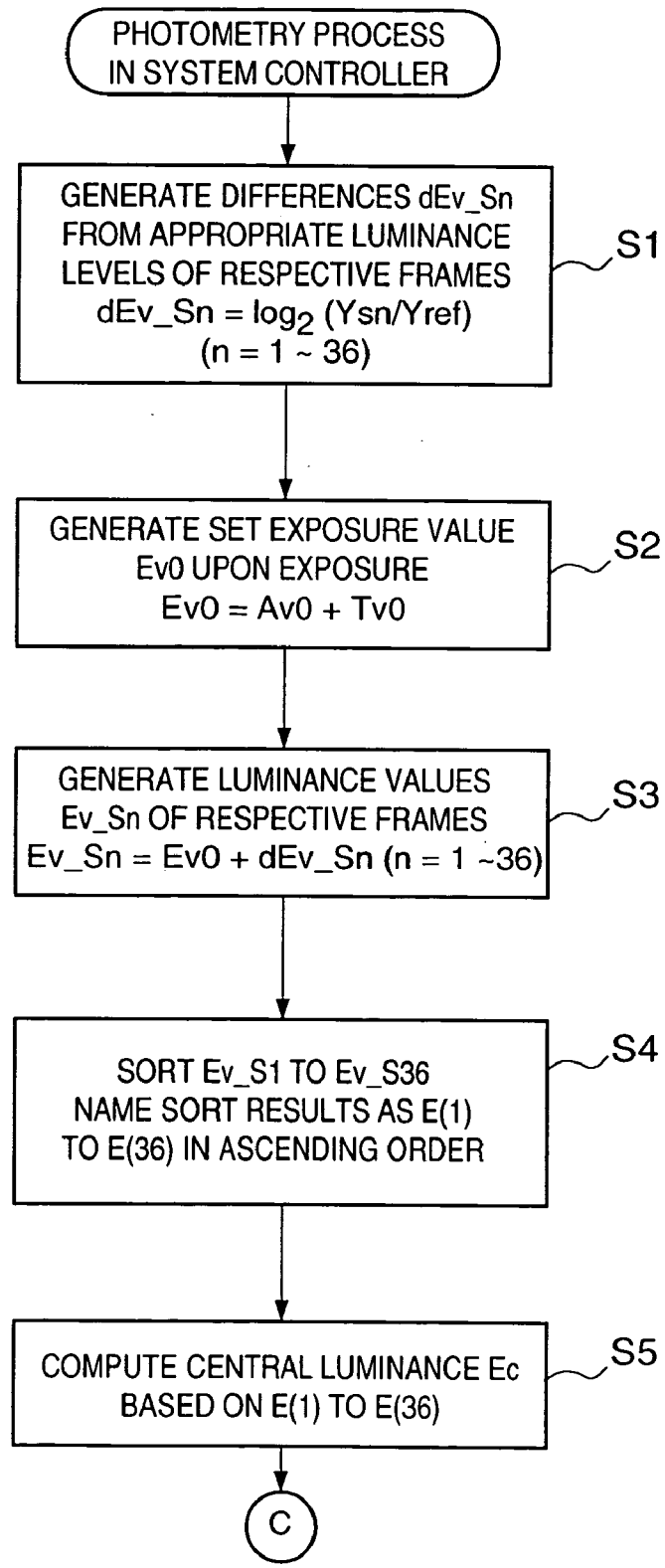
Figure 9C:
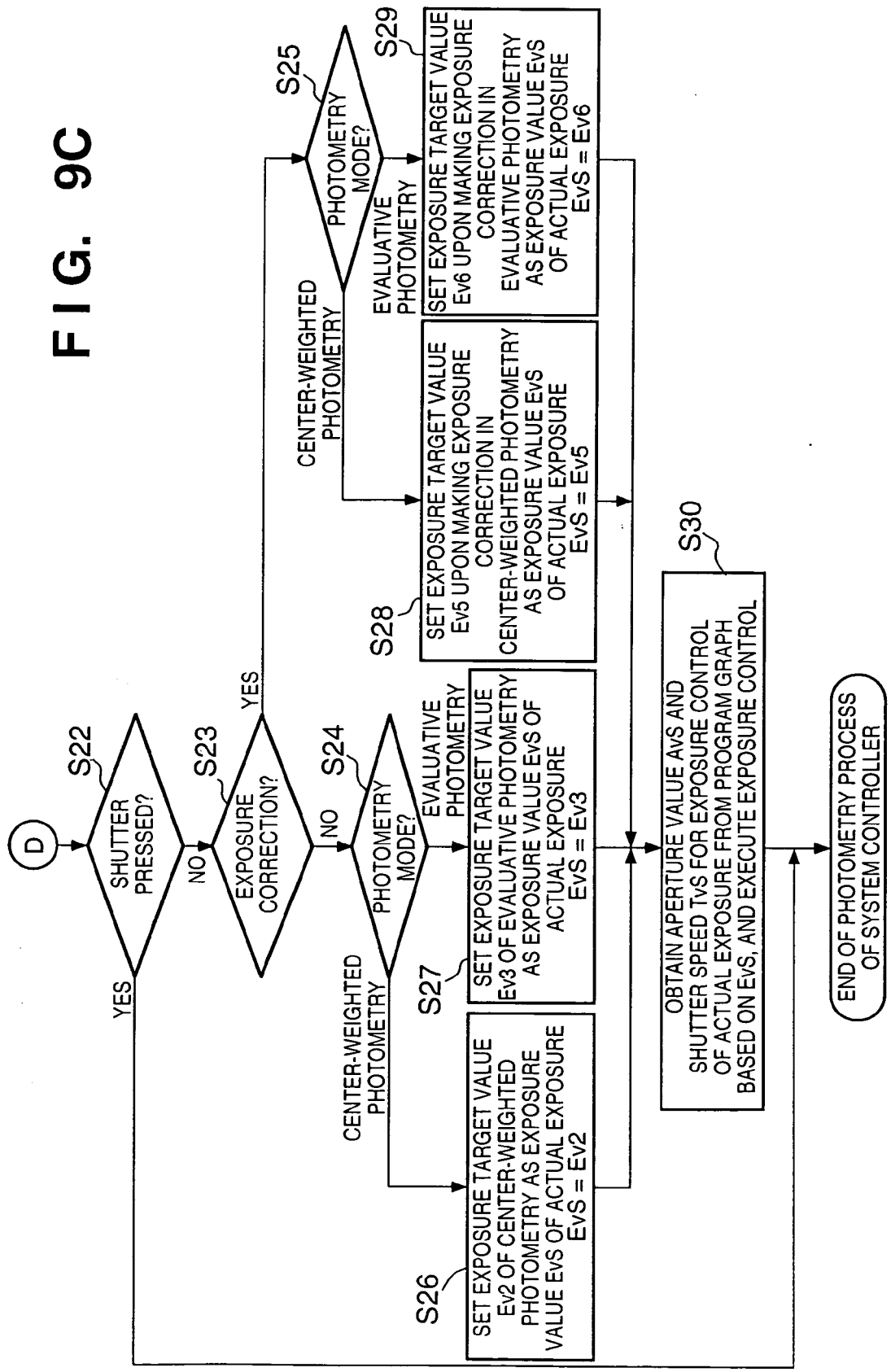

FIGS. 9A to 9C are flow charts showing the photometry process in the system controller according to the second embodiment of the present invention. Since the arrangement of the image sensing apparatus is the same as that in the first embodiment, a description thereof will be omitted.

In FIGS. 9A to 9C, steps S1 to S20, and S21 are the same as those in the first embodiment except that there is not step 13.

Step S31: The system controller 12 compares the value Edef with a predetermined value.

Step S32: If Edef is larger than the predetermined value, an aperture value AvC and shutter speed value TvC obtained by applying the object central luminance Ec obtained in step S5 to the program graph shown in FIG. 8 are set, and the flow advances to step S21. After that, the same operation as in the first embodiment is done.

Step S33: If Edef is smaller than the predetermined value, an aperture value AvS and shutter speed value TvS obtained by applying the exposure target value obtained in one of steps S9 to S12 to the program graph shown in FIG. 8 are set, and the flow advances to step S22. After that, the same operation as in the first embodiment is done. In this case, the display signal processing circuit 14 skips step S21 of adjusting the gain and offset level of an analog video signal with respect to the display device 16.

Third Embodiment

Figure 10:
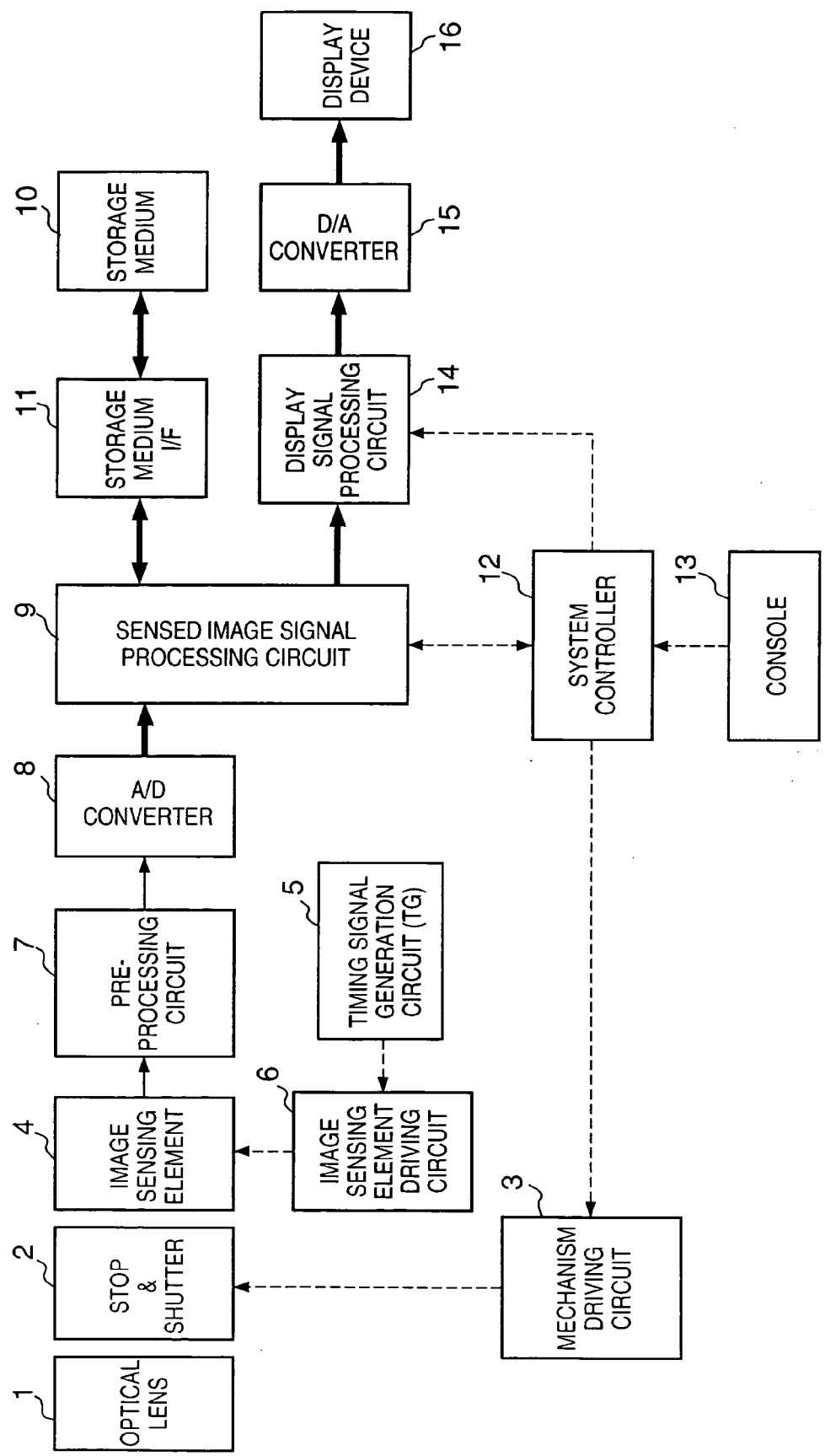
FIG. 10 is a block diagram showing the arrangement of an image sensing apparatus of the second embodiment.

FIG. 10 is a block diagram showing the arrangement of the third embodiment of an image sensing apparatus of the present invention.

Unlike in the first and second embodiments, the system controller 12 inputs a signal corresponding to the value Edef to the display signal processing circuit 14, which adjusts the gain and offset level of a digital video signal to be output to the display device 16, thus achieving EVF display having brightness equivalent to the exposure target value.

Note that the average luminance may be used in place of the object central luminance.

Also, the exposure value may be limited by controlling the shutter speed or aperture value alone.

Furthermore, gain adjustment may be implemented by changing the reference voltage of the D/A converter 15.

Another Embodiment

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The embodiments of the present invention have been explained. However, the present invention is not limited to the arrangements of these specific embodiments, and may be applied to any other arrangements as long as they can achieve the functions described in the appended claims or those of the arrangements of the embodiments.

The software and hardware arrangements of the aforementioned embodiments can be replaced as needed.

Also, the present invention may combine the aforementioned embodiments or their technical elements.

Furthermore, the present invention may be applied to a single apparatus formed by the overall or partial arrangement of the appended claims or embodiments, an apparatus combined with another apparatus, or a component that forms an apparatus.

Moreover, the present invention may be applied to various kinds of cameras such as a digital camera for sensing a moving or still image, a camera using a silver halide film, a single-lens reflex camera, a lens shutter camera, a monitor camera, and the like, an image sensing apparatus other than a camera, an image scanning apparatus, an optical apparatus, and the like, devices applied to these camera, image sensing apparatus, image scanning apparatus, optical apparatus, and the like, building components of these apparatuses, control methods of these apparatuses, and a medium such as a computer readable storage medium that supplies a control program of these apparatuses.

As described above, according to the above embodiments, more accurate photometry and confirmation of the target luminance level on the EVF can be achieved at the same time.

The present invention is not limited to the above embodiments and various changes and modifications can be made within the spirit and scope of the present invention. Therefore, to apprise the public of the scope of the present invention the following claims are made.

What is claimed is:

1. An apparatus comprising:
   an image sensing sensor adapted to convert an optical image into an image signal;
   a viewfinder adapted to display the image signal obtained by said image sensor; and
   a correction device adapted to correct brightness of said viewfinder in accordance with a difference between luminance level of the image signal obtained by said image sensing sensor, and a target luminance level which indicates an exposure value of a photographing operation.

2. The apparatus according to claim 1, wherein said correction device obtains the luminance level of the image signal obtained by said image sensing sensor by a first method, and obtains the target luminance level by a second method different from the first method.

3. The apparatus according to claim 2, wherein the first method is a method of obtaining an average luminance of the image signal obtained by said image sensing sensor.

4. The apparatus according to claim 2, wherein the first method is a method of obtaining a central luminance of the image signal obtained by said image sensing sensor.

5. The apparatus according to claim 2, wherein the second method is a method of obtaining the target luminance level in accordance with an exposure correction value.

6. The apparatus according to claim 5, wherein the exposure correction value is a value according to a difference between the luminance level of the image signal obtained by said image sensing sensor, and a reference luminance level.

7. The apparatus according to claim 2, wherein the second method is a method of obtaining the target luminance level in accordance with evaluative photometry results obtained by divisionally evaluating the luminance level of the image signal obtained by said image sensing sensor in correspondence with a plurality of positions on an image sensing surface of said image sensing sensor.

8. The apparatus according to claim 1, further comprising:
   an exposure control device adapted to sense an image under the exposure control corresponding to the target luminance level.

9. The apparatus according to claim 8, wherein said exposure control device makes the exposure control in correspondence with the luminance level of the image signal obtained by said image sensing sensor.

10. The apparatus according to claim 8, wherein said exposure control device performs the exposure control by a method different from a method in which said correction device correct brightness of the image signal.

11. The apparatus according to claim 1, wherein said correction device corrects the brightness of said viewfinder by brightness corresponding to the difference between the luminance level of the image signal obtained by said image sensing sensor, and the target luminance level.

12. The apparatus according to claim 1, wherein said correction device corrects the brightness of said viewfinder when the difference between the luminance level of the image signal obtained by said image sensing sensor, and the target luminance level is larger than a predetermined value.

13. The apparatus according to claim 12, wherein said correction device comprises an exposure control device adapted to make exposure control in correspondence with the luminance level of the image signal obtained by said image sensing sensor when the difference between the luminance level of the image signal obtained by said image sensing sensor, and the target luminance level is larger than the predetermined value.

14. The apparatus according to claim 1, wherein said correction device does not correct the brightness of said viewfinder when the difference between the luminance level of the image signal obtained by said image sensing sensor, and the target luminance level is smaller than a predetermined value.

15. The apparatus according to claim 14, wherein said correction device comprises an exposure control device adapted to make exposure control in correspondence with the target luminance level when the difference between the luminance level of the image signal obtained by said image sensing sensor, and the target luminance level is smaller than the predetermined value.

16. The apparatus according to claim 1, wherein said apparatus includes an image sensing apparatus.

17. The apparatus according to claim 1, wherein said apparatus includes a camera.

18. A control method for controlling an image sensing apparatus, comprising the steps of:

displaying the image signal obtained by an image sensing sensor on a viewfinder, and correcting the brightness of said viewfinder in accordance with a difference between a luminance level of the image signal obtained by said image sensing sensor, and a target luminance level of a photographing operation.

19. A computer readable medium that includes a program that controls an image sensing apparatus including a content of:

displaying the image signal obtained by an image sensing sensor on a viewfinder, and correcting the brightness of said viewfinder in accordance with a difference between a luminance level of the image signal obtained by said image sensing sensor, and a target luminance level which indicates an exposure value of a photographing operation.

* * * * *